(12) United States Patent
Tsirkin

(10) Patent No.: US 9,495,191 B2
(45) Date of Patent: Nov. 15, 2016

(54) USING VIRTUAL DISK IN VIRTUAL MACHINE LIVE MIGRATION

(71) Applicant: Red Hat Israel, Ltd., Raanana (IL)

(72) Inventor: Michael Tsirkin, Yokeneam Yillit (IL)

(73) Assignee: Red Hat Israel, Ltd., Raanana (IL)

( * ) Notice: Subject to any disclaimer, the term of this patent is extended or adjusted under 35 U.S.C. 154(b) by 152 days.

(21) Appl. No.: 14/166,412

(22) Filed: Jan. 28, 2014

(65) Prior Publication Data

US 2015/0212845 A1   Jul. 30, 2015

(51) Int. Cl.
*G06F 12/00* (2006.01)
*G06F 9/455* (2006.01)
*G06F 12/10* (2016.01)

(52) U.S. Cl.
CPC ....... *G06F 9/45558* (2013.01); *G06F 12/1027* (2013.01); *G06F 2009/4557* (2013.01)

(58) Field of Classification Search
CPC ................... G06F 9/45558; G06F 2009/4557; G06F 2009/45583
See application file for complete search history.

(56) References Cited

U.S. PATENT DOCUMENTS 7,197,490 B1* 3/2007 English ............. G06F 17/30067
7,624,240 B1* 11/2009 Colbert ................. G06F 9/4856 711/159

| | | | |
|---|---|---|---|
| 2010/0153341 A1 | 6/2010 | Driesen et al. |
| 2012/0284234 A1 | 11/2012 | Mashtizadeh et al. |
| 2013/0205106 A1 | 8/2013 | Tati et al. |
| 2013/0227551 A1 | 8/2013 | Tsirkin |
| 2013/0254500 A1 | 9/2013 | Nakajima et al. |

OTHER PUBLICATIONS

"Performance Best Practices for VMware vSphere 5.1", VMware, Inc. 2007-2012 http://www.vmware.com/pdf/Perf_Best_Practices_vSphere5.1.pdf.
"Disk I/O Performance", vmware.com http://pubs.vmware.com/vsphere-4-esx-vcenter/index.jsp?topic=/com.vmware.vsphere.dcadmin.doc_41/vsp_dc_admin_guide/performance_statistics/c_troubleshoot_disk.html, last accessed Oct. 16, 2013.

* cited by examiner

*Primary Examiner* — Brian Peugh
(74) *Attorney, Agent, or Firm* — Lowenstein Sandler LLP

(57) ABSTRACT

Systems and methods for implementing lazy disk I/O in virtual machine live migration. An example method may comprise: determining, by a first computer system, that contents of a memory page mapped into an address space of a virtual machine undergoing live migration from a second computer system to the first computer system is stored on a network-accessible virtual disk; storing, in a memory data structure, a mapping of an address of the memory page to an identifier of a location of the memory page on the virtual disk; and responsive to detecting an access to the memory page by the virtual machine, storing in a memory mapped into the address space of the virtual machine the memory page retrieved from the location of the memory page on the virtual disk.

20 Claims, 5 Drawing Sheets

USING VIRTUAL DISK IN VIRTUAL MACHINE LIVE MIGRATION

TECHNICAL FIELD

The present disclosure is generally related to virtualized computer systems, and is more specifically related to systems and methods for virtual machine live migration.

BACKGROUND

Virtualization may be viewed as abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate. Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines. Processor virtualization may be implemented by the hypervisor scheduling time slots on one or more physical processors for a virtual machine, rather than a virtual machine actually having a dedicated physical processor. Memory virtualization may be implemented by employing a page table (PT) which is a memory structure translating virtual memory addresses to physical memory addresses.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are methods and systems for implementing lazy disk I/O in virtual machine live migration. "Live migration" herein refers to the process of moving a running virtual machine from an origin host computer system to a destination host computer system without disrupting the guest operating system and the applications executed by the virtual machine. Live migration may involve copying the virtual machine execution state from the origin host to the destination host. The virtual machine execution state may comprise the memory state, the virtual processor state, the virtual devices state, and/or the network connectivity state.

Hence, the destination hypervisor may receive the virtual machine execution state over the network and store the execution state into the host memory mapped into the virtual machine address space. In an illustrative example, a migration agent may copy the execution state of the virtual machine being migrated, including a plurality of memory pages, from the origin host to the destination host while the virtual machine is still running at the origin host. Independently of the migration process, the running virtual machine may "launder" virtual memory pages by copying the memory contents into a backing store. In certain implementations, the backing store may be provided by a virtual disk exposed to the virtual machine and accessible via a network (e.g., a storage area network (SAN) or a network attached storage (SAN)).

To exclude redundant transmissions over the network of memory pages that have been laundered to a networked virtual disk, the origin hypervisor may, responsive to determining that a memory page mapped into the address space of a virtual machine has been laundered to the virtual disk, notify the destination hypervisor of the address of the memory page within the address space of the virtual machine and the address of the memory page contents on the virtual disk. At the receiving host, the disk I/O efficiency may be optimized by reducing unnecessary disk I/O accesses through implementing lazy disk I/O with respect to the virtual machine memory page contents stored on virtual disks.

In an illustrative example, responsive to receiving a notification that the contents of a virtual machine memory page is stored on a virtual disk, the destination hypervisor may store in its memory a mapping of the memory page address to the offset of the corresponding physical frame on the virtual disk, without actually reading the memory page contents from the disk into the memory. Later, when the memory page is accessed by the virtual machine, the hypervisor may intercept the memory page access attempt and read the memory page from the disk into a memory location mapped into the virtual machine address space, as described in more details herein below.

Various aspects of the above referenced methods and systems are described in details herein below by way of examples, rather than by way of limitation.

Figure 1:
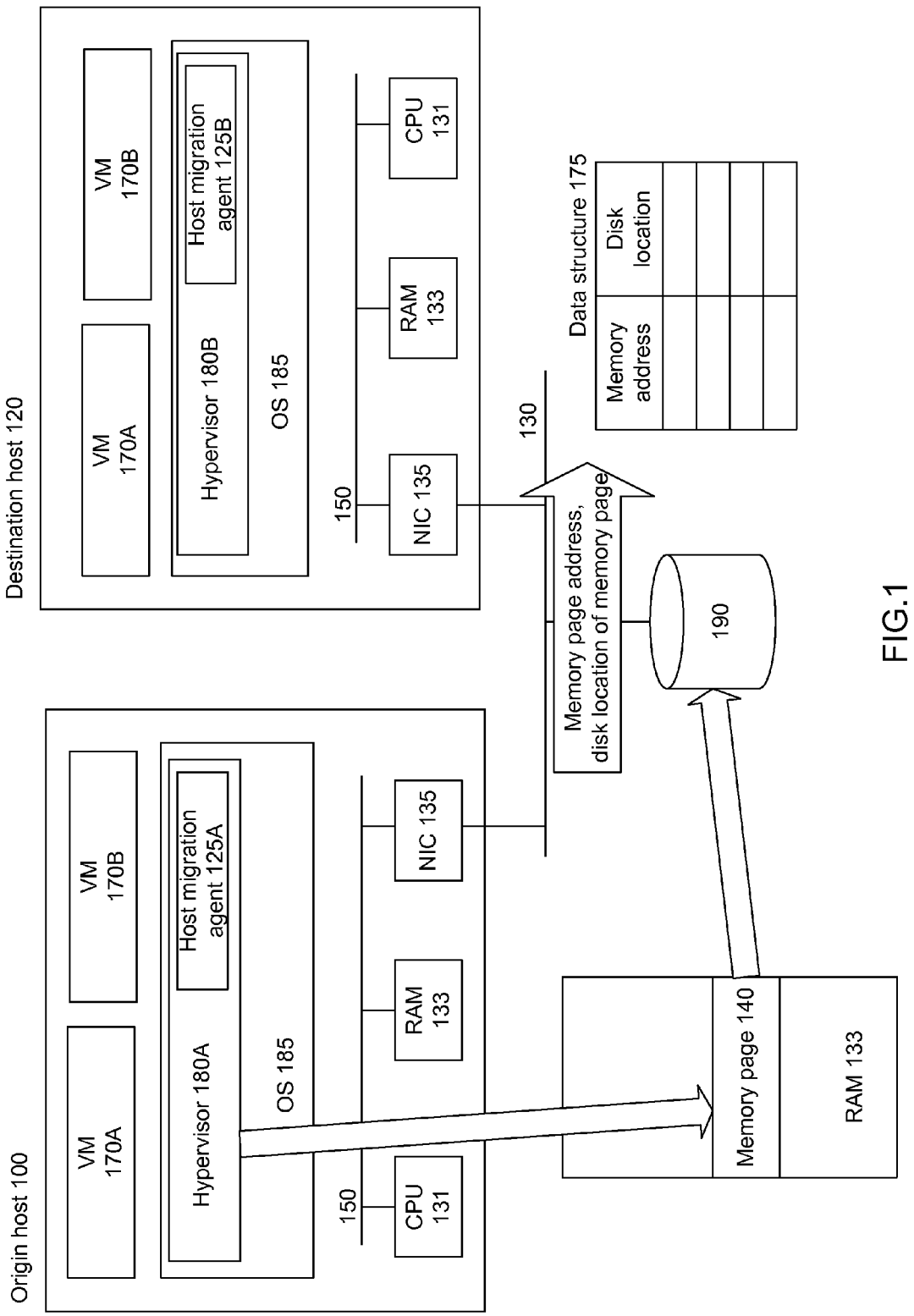
FIG. 1 schematically illustrates a high-level component diagram of one illustrative embodiment of a distributed computer system, in accordance with one or more aspects of the present disclosure.

FIG. 1 depicts a high-level component diagram of one illustrative example of a distributed computer system in accordance with one or more aspects of the present disclosure. "Computer system" herein shall refer to a system comprising one or more processors, one or more memory devices, and one or more input/output (I/O) interfaces. A distributed computer system may comprise one or more computer systems interconnected by one or more networks.

Computer system 100A, 100B may be interconnected, via a network 130, with one or more remote computers. Computer system 100A, 100B may comprise one or more processors 131 communicatively coupled to a memory device 133 and a network interface controller (NIC) 135. Local connections within host computer system 100A, 100B, including connections between processor 131, memory device 133, and NIC 135, may be provided by one or more local buses 150 of a suitable architecture.

"Physical processor" or "processor" herein shall refer to a device capable of executing instructions encoding arithmetic, logical, or I/O operations. In one illustrative example, a processor may follow Von Neumann architectural model and may comprise an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). "Memory device" herein shall refer to a volatile or non-volatile memory device, such as RAM, ROM, EEPROM, or any other device capable of storing data.

In an illustrative example, as schematically illustrated by FIG. 1, computer system 100A, 100B may run multiple virtual machines 170 by executing a software layer 180, often referred to as "hypervisor," above the hardware and below the virtual machines. In certain implementations, hypervisor 180 may be a component of operating system 185 executed by host computer system 100A, 100B. Alternatively, hypervisor 180 may be provided by an application running under host operating system 185, or may run directly on the host computer system 100A, 100B without an operating system beneath it. Hypervisor 180 may abstract the physical layer, including processors, memory, and I/O devices, and present this abstraction to virtual machines 170 as virtual devices, including virtual processors, virtual memory, and virtual I/O devices. Host migration agents 125A, 125B running on host computer systems 100A, 100B may perform virtual machine migration management functions in accordance with one or more aspects of the present disclosure. In certain implementations, a host migration agent may be implemented as a software component invoked by hypervisor 180. Alternatively, functions of host migration agent 125 may be performed by hypervisor 180.

The address space virtualization may be handled through the paging mechanism implemented to support a virtual memory environment where a virtual machine address space is simulated with a smaller amount of random access memory (RAM) and a backing store. In certain implementations, the backing store may be provided by a virtual disk exposed to the virtual machine and accessible via a network. The memory may be divided into pages of a defined size (e.g., 4 KB) which may be stored on a virtual disk exposed to the virtual machine and accessible via a network. The guest operating system may maintain a page directory and a set of page tables to keep track of the pages. When a virtual machine attempts to access a memory page, it may use the page directory and page tables to translate the virtual address into a physical address. If the page being accessed is not currently in the physical memory, a page-fault exception may be generated, responsive to which the virtual machine may read the page from the virtual disk and continue executing the thread.

In certain implementations, running virtual machines 170 may "launder" memory pages by copying the memory contents into a virtual disk 190. In an illustrative example, virtual disk 190 may reside on a network attached storage (NAS) system comprising one or more storage servers each coupled to one or more persistent data storage devices, such as magnetic or optical storage disks, solid-state drives (SSDs), etc. Alternatively, virtual disk 190 may reside may be represented by a storage area network (SAN) comprising a plurality of persistent data storage devices providing a block-level data storage.

Figure 2:
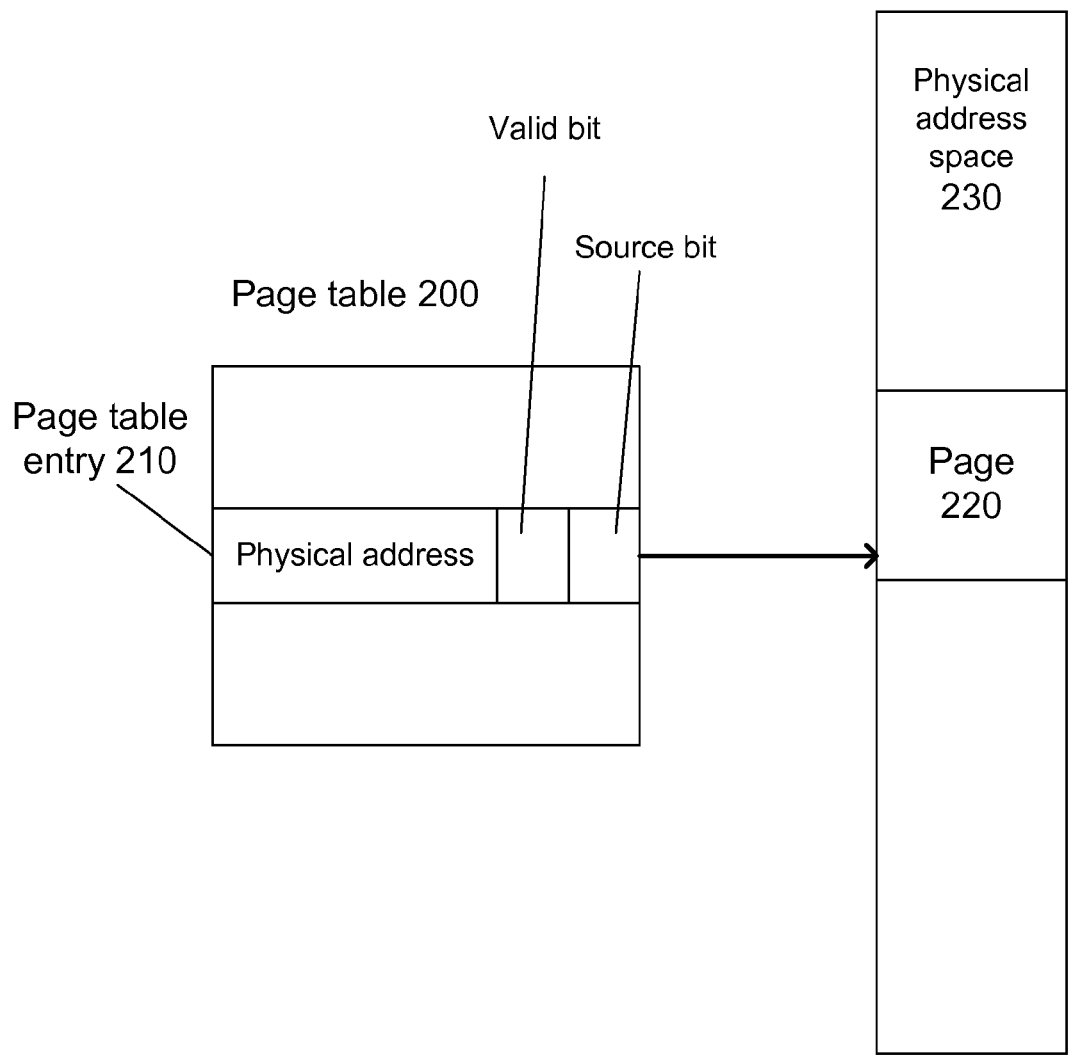
FIG. 2 schematically illustrates an example of a paging table structure implemented by the host computer system, in accordance with one or more aspects of the present disclosure.

FIG. 2 schematically illustrates an example of a paging mechanism implementation by destination host 100B, in accordance with one or more aspects of the present disclosure. Page table herein refers to a memory structure facilitating translation of virtual memory addresses to physical memory addresses. As schematically illustrated by FIG. 2, page table 200 maintained by host computer system 100B may include a plurality of page table entries 210 corresponding to a plurality of memory pages mapped into the virtual address space of virtual machine 170. Each page table entry 210 may represent a mapping of a virtual address of a memory page to the physical address of a corresponding physical frame.

Each page table entry may further comprise a valid bit and a dirty bit. The valid bit may indicate whether the memory page is currently present in the physical memory frame referenced by the corresponding page table entry. The dirty bit may indicate whether the memory page has been written to after having been paged in from the backing store. If the dirty bit is set, the memory page needs to be synchronized with the corresponding physical frame the backing store. The synchronization process may also be referred to as "page laundering."

In accordance with one or more aspects of the present disclosure, each page table entry may further comprise a source bit. If the valid bit is cleared and source bit is set, the memory page contents may be retrieved from a virtual disk location, as described in more details herein below.

In an illustrative example, virtual machine 170A may be undergoing live migration from origin host computer system 100A to destination host computer system 100B, as schematically illustrated by FIG. 1. Live migration may involve copying the virtual machine execution state from the origin host to the destination host. The virtual machine execution state may comprise the memory state, the virtual processor state, the virtual devices state, and/or the connectivity state. Host migration agents 125A-125B may manage copying, over network 130, the execution state of migrating virtual machine 170A, including a plurality of memory pages 140, from origin host 100A to destination host 100B while virtual machine 170A is still running on origin host 100A.

Independently of the migration process, the running virtual machine may "launder" virtual memory pages by copying the memory contents into a network-accessible virtual disk 190. Thus, some memory pages may be sent over the network twice: by the migration process and by the virtual memory management process.

To exclude redundant transmissions over the network of memory pages that have been laundered to a networked virtual disk, the origin hypervisor may, responsive to determining that a memory page mapped into the address space of a virtual machine has been laundered to the virtual disk, notify the destination hypervisor of the address of the memory page within the address space of the virtual machine and the location of the corresponding physical frame on the virtual disk. A the receiving host, the disk I/O efficiency may be optimized by reducing unnecessary disk I/O accesses through implementing lazy disk I/O with respect to the virtual machine memory page contents stored on virtual disks.

In an illustrative example, host migration agent 125B running on destination host computer system 100B may determine that the contents of a virtual machine memory page is stored on virtual disk 190. In an illustrative example, host migration agent 125B may be notified, by host migration agent 125A running on origin host computer system 100A, of a memory page address and the corresponding disk location storing the contents of the memory page. The disk location identifier may comprise a disk identifier and an offset of the physical frame on the disk.

Responsive to receiving the above described notification, the destination hypervisor may read the memory page from the virtual disk, store the memory page in the host memory, and map the memory page into the virtual machine address space. Alternatively, to optimize the disk I/O efficiency, the destination hypervisor may, responsive to determining that the contents of a virtual machine memory page is stored on a virtual disk, store in its memory a mapping of the memory page address to the offset of the memory page on the virtual disk, without actually reading the memory page contents from the disk into the memory. The mapping may be stored in a memory data structure 175, as schematically illustrated by FIG. 1. The destination hypervisor may further clear the valid bit of the page table entry corresponding to the memory page, so that an attempt to access the memory page would trigger a page fault intercepted by the hypervisor.

Figure 3:
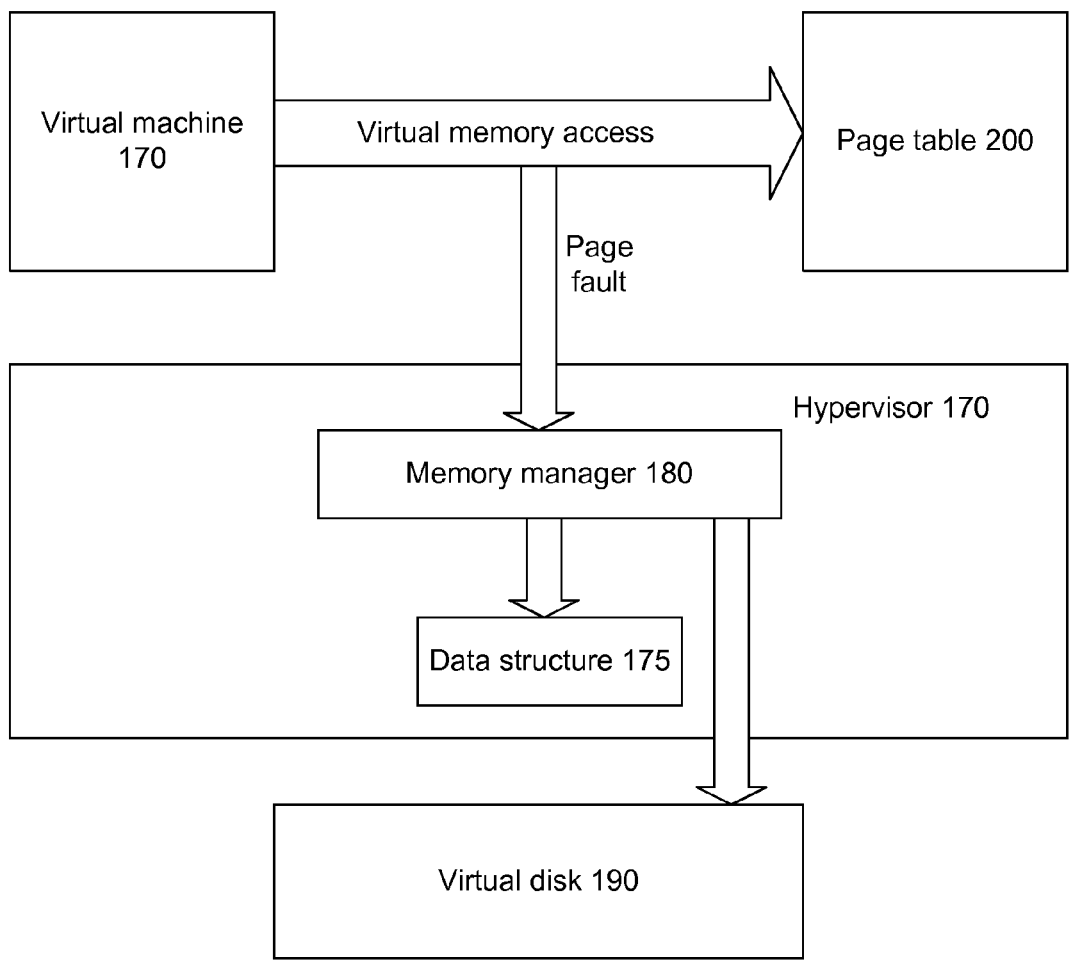
FIG. 3 schematically illustrates an example of lazy disk input/output (I/O) in virtual machine live migration, in accordance with one or more aspects of the present disclosure.

When the memory page is eventually accessed by the virtual machine, the hypervisor may intercept the ensuing page fault and invoke the memory manager of host computer system 100B to look up in data structure 175 the virtual address of the memory page being accessed, as schematically illustrated by FIG. 3. The memory manager may then retrieve from data structure 175 the location of the corresponding physical frame on disk 190 and read the contents of memory page 220 from the identified location on disk 190 into the physical memory 133. The memory manager may then map the virtual address of the memory page to its location in the physical memory, and set the valid bit of the page table entry corresponding to the memory page. Upon return from the hypervisor call triggered by the page fault, the virtual machine may complete the memory access operation.

In certain implementations, the hypervisor may maintain in its memory a data structure mapping the virtual disk offsets to corresponding virtual memory addresses for the memory pages the contents of which are stored on the virtual disk. In an illustrative example, each record of memory data structure 175 of FIG. 1 may store a bi-directional mapping of a memory page address to the offsets of the corresponding data frame on the virtual disk.

The hypervisor may further be programmed to detect an access by a virtual machine to the local on the virtual disk which stores the contents of a virtual memory page (e.g., by intercepting the virtual machine's call to the virtual disk driver), before the virtual memory page has been accessed and copied into the physical memory. Responsive to intercepting a write request to the virtual disk, and before allowing the request to be completed, the hypervisor may copy the memory page contents from the virtual disk to the host memory, without mapping the host memory location into the virtual machine address space. The hypervisor may store in it memory the mapping of the virtual address of the memory page to the host physical address.

When the memory page is eventually accessed by the virtual machine, the hypervisor may intercept the memory page access attempt and invoke the memory manager of host computer system 100B to map the host memory location to map the virtual address of the memory page to its location in the physical memory, and set the valid bit of the page table entry corresponding to the memory page. Upon return from the hypervisor call triggered by the page fault, the virtual machine may complete the memory access operation.

Figure 4:
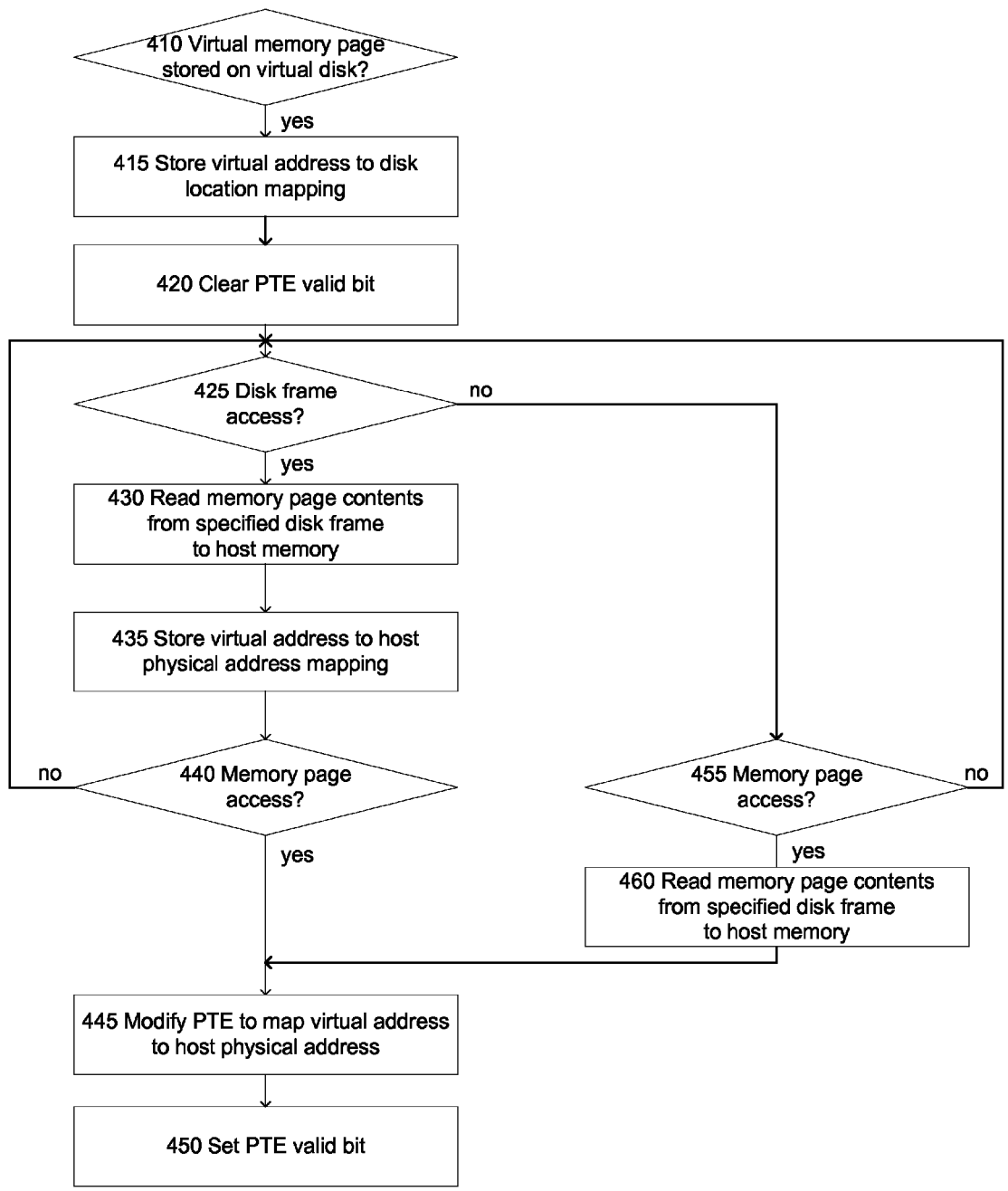
FIG. 4 schematically illustrates a flow diagram of an example method for implementing lazy disk input/output (I/O) in virtual machine live migration, in accordance with one or more aspects of the present disclosure.

FIG. 4 depicts a flow diagram of an example method 400 for implementing lazy disk I/O in virtual machine live migration. Method 400 may be performed by a computer system that may comprise hardware (e.g., circuitry, dedicated logic, and/or programmable logic), software (e.g., instructions executable on a computer system to perform hardware simulation), or a combination thereof. Method 400 and/or each of its individual functions, routines, subroutines, or operations may be performed by one or more processors of the computer system executing the method (e.g., computer system 100B of FIG. 1). In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other.

At block 410, the destination hypervisor may determine that the content of a virtual machine memory page is stored on a virtual disk. As noted herein above, in an illustrative example, the determination may comprise receiving a notification from the origin hypervisor. Alternatively, the determination may comprise detecting, by the origin hypervisor, virtual disk access by the virtual machine, by intercepting the virtual machine requests to the virtual disk driver.

Responsive to determining, at block 410, that the content of a virtual machine memory page is stored on a virtual disk, the hypervisor may, at block 415, store in a memory data structure the mapping of the memory page address to the location identifier of the corresponding virtual disk frame. In illustrative examples, the memory page address may be provided by a guest physical address or a guest virtual address. The virtual disk location identifier may be provided by a virtual disk identifier and the offset of the physical frame on the virtual disk.

At block 420, the hypervisor may clear the valid bit of the page table entry corresponding to the memory page, so that an attempt to access the memory page would trigger a page fault intercepted by the hypervisor. The hypervisor may further set the source bit of the page table entry corresponding to the memory page, to indicate that the memory page contents may be retrieved from the virtual disk location specified by the mapping data structure.

Responsive to detecting, at block 425, a write access to the physical frame on the virtual disk, the hypervisor may, at block 430, invoke the host memory manager to read the contents of the memory page from the identified virtual disk location into the host physical memory.

At block 435, the hypervisor may store in its memory the mapping of the virtual address of the memory page to the host physical address.

Responsive to detecting, at block 440, an access to the memory page by the virtual machine, the hypervisor may, at block 445, invoke the memory manager of the host computer system to map the virtual address of the memory page to its location in the physical memory.

At block 450, the host memory manager may set the valid bit of the page table entry corresponding to the memory page.

Should no access to the virtual disk frame storing the contents of the virtual memory page be intercepted prior to an access, by the virtual machine, to the virtual memory page, the hypervisor may, responsive to intercepting the virtual memory page access at block 455, continue processing at block 460, by invoking the host memory manager to read the contents of the memory page from the identified virtual disk location into the host physical memory.

Then, the memory manager may map the virtual address of the memory page to its location in the physical memory and set the valid bit of the page table entry corresponding to the memory page, as schematically referenced by blocks 445-450.

Upon return from the hypervisor call triggered by the page fault, the virtual machine may complete the memory access operation.

Figure 5:
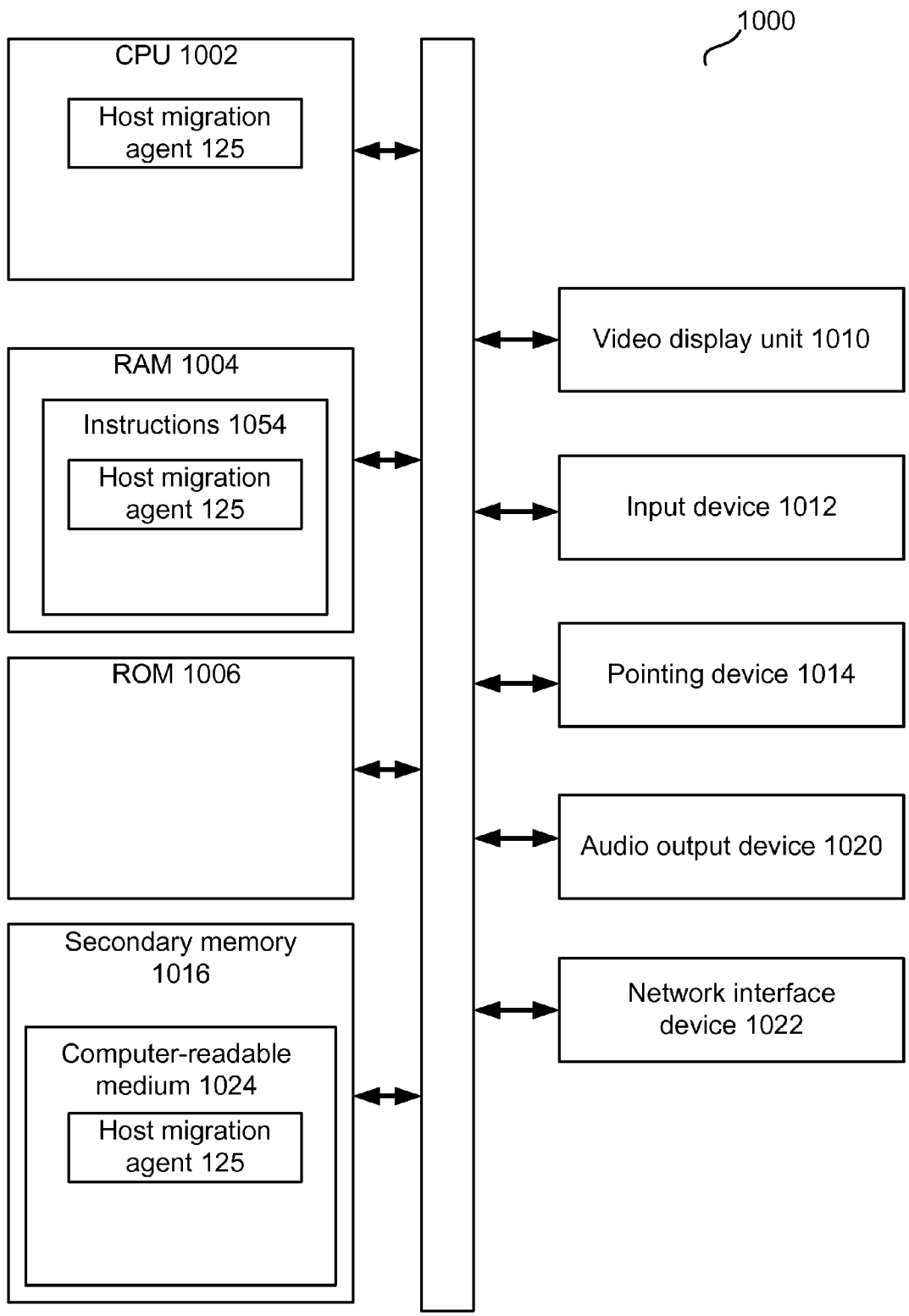
FIG. 5 schematically illustrates a block diagram of an illustrative computer system operating in accordance with the examples of the present disclosure.

FIG. 5 depicts an example computer system 1000 within which a set of instructions, for causing the computer system to perform any one or more of the methods described herein, may be executed. In certain implementations, computer system 1000 may correspond to computer system 100A, 100B of FIG. 1.

In one example, computer system 1000 may be connected (e.g., via a network, such as a Local Area Network (LAN), an intranet, an extranet, or the Internet) to other computer systems. Computer system 1000 may operate in the capacity of a server or a client computer in a client-server environment, or as a peer computer in a peer-to-peer or distributed network environment. Computer system 1000 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, computer system 1000 may comprise a physical processor 1002, a volatile memory 1004 (e.g., random access memory (RAM)), a non-volatile memory 1006 (e.g., read-only memory (ROM) or electrically-erasable programmable ROM (EEPROM)), and a secondary memory 1016 (e.g., a data storage device), which may communicate with each other via a bus 1008.

Processor 1002 may be provided by one or more physical processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 1000 may further comprise a network interface device 1022. Computer system 1000 also may comprise a video display unit 1010 (e.g., an LCD), an alphanumeric input device 1012 (e.g., a keyboard), a pointing device 1014 (e.g., a mouse), and an audio output device 1020 (e.g., a speaker).

Secondary memory 1016 may comprise a non-transitory computer-readable storage medium 1024 on which may be stored instructions of host migration agent 125 implementing method 400 for implementing lazy disk I/O in virtual machine live migration. Instructions of host migration agent 125 may also reside, completely or partially, within the main memory 1004 and/or within processor 1002 during execution thereof by computer system 1000, hence, main memory 1004 and processor 1002 may also constitute machine-readable storage media.

While computer-readable storage medium 1024 is shown in the illustrative embodiment as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any non-transitory medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system's registers and memories into other data similarly represented as physical quantities within the computer system memories or registers or other such information storage, transmission or display devices.

Embodiments described herein also relate to an apparatus for performing the methods described herein. This apparatus may be specially constructed for the required purposes, or it may comprise a general purpose computer system selectively programmed by a computer program stored in the computer system. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples and embodiments, it will be recognized that the present disclosure is not limited to the embodiments described. The scope of the disclosure should be determined with reference to the following claims, along with the full scope of equivalents to which the claims are entitled.

The invention claimed is:

1. A method, comprising:

determining, by a processor of a first computer system, that contents of a memory page mapped into an address space of a virtual machine undergoing live migration from a second computer system to the first computer system is stored on a network-accessible virtual disk;

storing, in a memory data structure, a mapping of an address of the memory page to an identifier of a location of the memory page on the virtual disk;

setting a source bit in a page table entry associated with the memory page, the source bit indicating that the contents of the memory page has been stored on the virtual disk;

detecting an access to the memory page by the virtual machine;

responsive to ascertaining that the source bit is set, retrieving the contents of the memory page from the location on the virtual disk associated with the memory page by the mapping stored in the data structure; and storing the contents of the memory page in a memory range mapped into the address space of the virtual machine.

2. The method of claim 1, wherein determining that the contents of the memory page is stored on the virtual disk comprises receiving a notification from the second computer system.

3. The method of claim 1, wherein storing the mapping comprises marking as invalid a page table entry for the memory page.

4. The method of claim 3, wherein storing the memory page in the memory mapped into the address space of the virtual machine comprises marking as valid the page table entry for the memory page.

5. The method of claim 1, further comprising:
responsive to detecting an access to the location of the memory page on the virtual disk, reading the memory page from the virtual disk into a hypervisor memory.

6. The method of claim 1, wherein the mapping of the address of the memory page to the identifier of the location of the memory page on the virtual disk is bi-directional.

7. The method of claim 1, wherein the virtual disk resides on one of: a network attached storage (NAS) system or a storage area network (SAN) system.

8. The method of claim 1, wherein the identifier of the location of the memory page on the virtual disk comprises an identifier of the virtual disk and an offset on the virtual disk.

9. A first computer system, comprising:
a memory to store a memory data structure; and
a processor, operatively coupled to the memory, to:
determine that contents of a memory page mapped into an address space of a virtual machine undergoing live migration from a second computer system to the first computer system is stored on a network-accessible virtual disk;
store, in the memory data structure, a mapping of an address of the memory page to an identifier of a location of the memory page on the virtual disk;
set a source bit in a page table entry associated with the memory page, the source bit indicating that the contents of the memory page has been stored on the virtual disk;
detect an access to the memory page by the virtual machine;
responsive to ascertaining that the source bit is set, retrieve the contents of the memory page from the location on the virtual disk associated with the memory page by the mapping stored in the data structure; and
store the contents of the memory page in a memory range mapped into the address space of the virtual machine.

10. The first computer system of claim 9, wherein to determine that the contents of the memory page is stored on the virtual disk, the processor is to receive a notification from the second computer system.

11. The first computer system of claim 9, wherein to store the mapping, the processor is to mark as invalid a page table entry for the memory page.

12. The first computer system of claim 11, wherein to store the memory page in the memory mapped into the address space of the virtual machine, the processor is to mark as valid the page table entry for the memory page.

13. The first computer system of claim 9, wherein the processor is further to:
responsive to detecting an access to the location of the memory page on the virtual disk, read the memory page from the virtual disk into a hypervisor memory.

14. The first computer system of claim 9, wherein the virtual disk resides on one of: a network attached storage (NAS) system or a storage area network (SAN) system.

15. A computer-readable non-transitory storage medium comprising executable instructions that, when executed by a processor of a first computer system, cause the processor to:
determine, by the processor, that contents of a memory page mapped into an address space of a virtual machine undergoing live migration from a second computer system to the first computer system is stored on a network-accessible virtual disk;
store, in a memory data structure, a mapping of an address of the memory page to an identifier of a location of the memory page on the virtual disk;
set a source bit in a page table entry associated with the memory page, the source bit indicating that the contents of the memory page has been stored on the virtual disk;
detect an access to the memory page by the virtual machine;
responsive to ascertaining that the source bit is set, retrieve the contents of the memory page from the location on the virtual disk associated with the memory page by the mapping stored in the data structure; and
store the contents of the memory page in a memory range mapped into the address space of the virtual machine.

16. The computer-readable non-transitory storage medium of claim 15, wherein executable instructions to determine that the contents of the memory page is stored on the virtual disk further comprise executable instructions causing the processor to receive a notification from the second computer system.

17. The computer-readable non-transitory storage medium of claim 15, wherein executable instructions to store the mapping comprise executable instructions causing the processor to mark as invalid a page table entry for the memory page.

18. The computer-readable non-transitory storage medium of claim 17, wherein executable instructions to store the memory page in the memory mapped into the address space of the virtual machine comprise executable instructions causing the processor to mark as valid the page table entry for the memory page.

19. The computer-readable non-transitory storage medium of claim 17, further comprising executable instructions causing the processor to:
   responsive to detecting an access to the location of the memory page on the virtual disk, read the memory page from the virtual disk into a hypervisor memory.

20. The computer-readable non-transitory storage medium of claim 15, wherein the virtual disk resides on one of: a network attached storage (NAS) system or a storage area network (SAN) system.

* * * * *